Patented Oct. 7, 1924.

1,510,795

UNITED STATES PATENT OFFICE.

SPENCER B. NEWBERRY, OF CLEVELAND, OHIO, ASSIGNOR TO THE MEDUSA CEMENT PAINT COMPANY, OF CLEVELAND, OHIO, A CORPORATION OF MAINE.

CEMENT PAINT.

No Drawing. Application filed October 29, 1921. Serial No. 511,467.

*To all whom it may concern:*

Be it known that I, SPENCER B. NEWBERRY, a citizen of the United States, and residing at Cleveland, Cuyahoga County, State of Ohio, have invented certain new and useful Improvements in Cement Paints, of which the following is a specification.

It is well known that Portland cement mixed with water to the consistency of cream may be used as a paint for concrete, metal or wood, but that unless kept moist for some time after applying the cement coating hardens imperfectly and is easily washed away by rain. I have found that this defect may be overcome by incorporating with the cement certain materials which have the property of holding moisture or absorbing moisture from the air, also of retarding the setting of cement, and that a paint composed of Portland cement with such additions becomes sufficiently firm and hard after a few hours to resist injury from rain, and continues to harden, forming a permanent enamel surface.

The substance which I have found most effective in retarding the set of cement is boric or boracic acid $H_3BO_3$, either free or in combination with soda in the form of borax. Only a very small amount of this need be used, amounting to from one-tenth to one per cent of the weight of cement.

The substances which I have found most effective in retaining moisture, thus enabling cement to set and harden without further application of water are deliquescent or hygroscopic salts such as caustic soda, potassium carbonate, and the chlorides of the alkaline earths, such as calcium chloride or magnesium chloride. Ammonium chloride may also be used, as this in contact with cement gives off ammonia and forms calcium chloride. The amount of hygroscopic salt required may vary from perhaps one per cent to ten per cent of the weight of cement used.

It is understood that boracic acid either free or combined as a borate, without the addition of hygroscopic salt, may be used with satisfactory results. I prefer however to add both boracic acid, preferably in the form of borax and a hygroscopic salt such as calcium chloride.

For practical use the cement and the salts in suitable quantity are ground together to a fine, dry powder which may be kept preferably in closed containers until required for use. The cement paint is made by mixing the powder with water to the consistency of a thin cream, for which the addition of 40 to 60 per cent of water will be required. The paint is then applied by means of brushes in the usual manner, or spread upon the surface by a jet of compressed air. By boracic acid I mean boracic or boric acid, $H_3BO_3$, either free or in combination as a borate, for example, sodium tetraborate or borax, $Na_2B_4O_7$.

By a hygroscopic salt I mean a salt which absorbs water from the air, for example, caustic soda, potassium carbonate, or the chloride of an alkaline earth metal or an earth metal such as calcium chloride or magnesium chloride, or a soluble chloride such as ammonium chloride which will form calcium chloride in contact with cement.

Having thus described my invention what is claimed as new and desired to be secured by Letters Patent is:

1. A cement paint base consisting of Portland cement incorporated with boracic acid and a hygroscopic salt.

2. A cement paint base consisting of Portland cement incorporated with one-tenth to one per cent of its weight of boracic acid and one per cent to ten per cent of its weight of a hygroscopic salt.

3. A cement paint base consisting of Portland cement incorporated with boracic acid and an alkaline earth chloride.

4. A cement paint base consisting of Portland cement incorporated with one-tenth to one per cent of its weight of boracic acid and one per cent to ten per cent of its weight of an alkaline earth chloride.

5. Cement paint consisting of Portland cement incorporated with boracic acid and a hygroscopic salt and mixed with water for use.

6. Cement paint consisting of Portland cement incorporated with one-tenth to one per cent of its weight of boracic acid and one per cent to ten per cent of its weight of an alkaline earth chloride and mixed with water for use.

In testimony whereof I hereunto affix my signature.

SPENCER B. NEWBERRY.